(12) United States Patent
Zemer et al.

(10) Patent No.: US 7,492,355 B2
(45) Date of Patent: Feb. 17, 2009

(54) WEB BROWSER FOR USE WITH A TELEVISION DISPLAY FOR PREVENTING SCREEN BURN

(75) Inventors: Richard Allen Zemer, Noblesville, IN (US); Mark Gilmore Mears, Zionsville, IN (US); Chad Andrew Lefevre, Indianapolis, IN (US); Aaron Hal Dinwiddie, Cicero, IN (US); Joseph Wayne Forler, Zionsville, IN (US)

(73) Assignee: Thomson Licensing, Boulogne-Billancourt (FR)

( * ) Notice: Subject to any disclaimer, the term of this patent is extended or adjusted under 35 U.S.C. 154(b) by 616 days.

(21) Appl. No.: 10/512,320

(22) PCT Filed: Apr. 17, 2003

(86) PCT No.: PCT/US03/11873

§ 371 (c)(1),
(2), (4) Date: Oct. 22, 2004

(87) PCT Pub. No.: WO03/090121

PCT Pub. Date: Oct. 30, 2003

(65) Prior Publication Data

US 2006/0055780 A1    Mar. 16, 2006

Related U.S. Application Data

(60) Provisional application No. 60/374,406, filed on Apr. 22, 2002, provisional application No. 60/374,415, filed on Apr. 22, 2002.

(51) Int. Cl.
*G06F 3/02*    (2006.01)
*G06F 3/00*    (2006.01)
*H04N 3/20*    (2006.01)

(52) U.S. Cl. .............. 345/172; 345/156; 345/168; 715/718; 715/716; 348/569; 348/173

(58) Field of Classification Search ............... 345/172, 345/168, 156; 715/718, 716; 348/569, 173
See application file for complete search history.

(56) References Cited

U.S. PATENT DOCUMENTS 5,016,003 A * 5/1991 Rice et al. ............. 340/825.19

(Continued)

FOREIGN PATENT DOCUMENTS

EP         0575956        12/1993

(Continued)

OTHER PUBLICATIONS

Special Edition Using Windows 95 with Internet Explorer, Copyright 1998, Que Corporation, Library of Congress Catalog No. 97-80803, pp. 1-28.*

(Continued)

*Primary Examiner*—Amare Mengist
*Assistant Examiner*—Robert R Rainey
(74) *Attorney, Agent, or Firm*—Robert D. Shedd; Joseph J. Opalach; Reitseng Lin

(57) ABSTRACT

Screen burn on televisions having Internet browser capability is avoided by removing the conventional static icons such as toolbars and buttons from the default browser and replacing their functions with keyboard keys. The invention is especially useful in projection televisions and with keyboards which have keys assigned to browser functions. Favorite URLs can be mapped to a favorite key by holding down the favorite key while a favorite web page is displayed.

18 Claims, 6 Drawing Sheets

U.S. PATENT DOCUMENTS

| | | | |
|---|---|---|---|
| 5,048,119 A * | 9/1991 | Wassink | 455/161.1 |
| 5,317,403 A * | 5/1994 | Keenan | 725/38 |
| 5,335,168 A | 8/1994 | Walker | |
| 5,465,366 A | 11/1995 | Heineman | |
| 5,796,945 A | 8/1998 | Tarabella | |
| 5,819,284 A | 10/1998 | Farber et al. | |
| 6,002,427 A | 12/1999 | Kipust | |
| 6,034,689 A * | 3/2000 | White et al. | 715/854 |
| 6,108,028 A | 8/2000 | Skarbo et al. | |
| 6,313,878 B1 | 11/2001 | Jankowiak | |
| 6,470,178 B1 * | 10/2002 | Cummings-Hill et al. | 455/186.1 |
| 6,564,379 B1 * | 5/2003 | Knee et al. | 725/42 |
| 6,625,649 B1 * | 9/2003 | D'Souza et al. | 709/225 |
| 7,209,649 B2 | 4/2007 | Kobayashi | |
| 2001/0005199 A1 * | 6/2001 | Anderson | 345/168 |

FOREIGN PATENT DOCUMENTS

| | | |
|---|---|---|
| EP | 0811940 | 12/1997 |
| JP | 7322164 | 8/1995 |
| JP | 10282877 | 10/1998 |
| JP | 200075847 | 3/2000 |
| JP | 2000-194479 | 7/2000 |
| JP | 2001228846 | 8/2001 |
| JP | 2002112124 | 4/2007 |
| WO | WO9741506 | 11/1997 |

OTHER PUBLICATIONS

C# and The .NET Framework: The C++ Perspective, Copyright 2002, First Printing Sep. 2001, Sams Publishing, Library of Congress Catalog No. 2001093492, pp. 1-8.*

Visual Basic Shell Programming, Copyright 2000, O'Reilly & Associates, Inc., pp. 1-2.*

Special Edition Using Windows 95 with Internet Explorer, Copyright 1998, Que Corporation, Library of Congress Catalog No. 97-80803, pp. 1-24 as copied for scanning, complete text available online at http://proquest.safaribooksonline.com/0789715538.*

C# and the .NET Framework: The C++ Perspective, Copyright 2002, First Printing Sep. 2001, Sams Publishing, Library of Congress Catalog No. 2001093492, pp. 1-2 as copied for scanning, complete text available online at http://proquest.safaribooksonline.com/067232153x.*

Anonymous: "Professional JavaScript WebTV", Internet article, Apr. 12, 2001, pp. 1-4.

Anonymous: "Getting Started with your browser", Internet article, 2002, pp. 1-2.

Searcha Report Dated Aug. 13, 2003.

"Top 10 Tips for Internet Explorer Users" Create for Mississippi, Apr. 2001.

* cited by examiner

HOME
BACK
FORWARD
STOP
ADDRESS
FIND
TEXT SIZE
FAVORITE
REFRESH
STOP
GO TO
OPEN BROWSER
CLOSE BROWSER
CLOSE WINDOW

WEB BROWSER FOR USE WITH A TELEVISION DISPLAY FOR PREVENTING SCREEN BURN

CROSS-REFERENCE TO RELATED APPLICATIONS

This application claims the benefit, under 35 U.S.C. § 365 of International Application PCT/US03/11873, filed Apr. 17, 2002, which was published in accordance with PCT Article 21(2) on Oct. 30, 2003 in English and which claims the benefit of U.S. Provisional Patent Application No. 60/374,406, filed Apr. 22, 2002 and U.S. Provisional Patent Application No. 60/374,415, filed Apr. 22, 2002.

TECHNICAL FIELD OF INVENTION

This invention relates to the field of television apparatus and methods, particularly television systems having integrated Internet browsers.

BACKGROUND ART

The problem of screen burn in displays such as cathode ray tubes is very well known, as are the various screen saver solutions, which have become widely used, primarily in the field of computer monitors. In the field of television apparatus, screen savers are not generally used or needed because television broadcast video does not usually contain content that is fixed for long periods. Plasma displays, which are especially susceptible to screen burn, are used in higher end television apparatus.

Television apparatus with integrated Internet browser capability have become commercially available, generally including a keyboard that uses infrared signals to control the browser. The advantage of such television apparatus with integrated Internet browser capability controlled without the need for wiring by a keyboard is that the user can toggle between television viewing and using the Internet, or do both simultaneously with a reduced-size browser window on one side and a reduced-size video window on the other side. Projection televisions having the integrated Internet browser, which have recently become available, are particularly useful due to the larger screens available with such apparatus. When such television apparatus is used in the browser mode for extended periods, screen burn may occur due to the static nature of portions of typical Internet browser displays. Such burn problem is more acute with respect to projection televisions than with conventional cathode ray tube television displays. It is an object of the present invention to avoid screen burn due to prolonged display of Internet browsers' menus (on-screen displays) on television displays, especially on projection television displays.

DISCLOSURE OF INVENTION

This object, and others which will become apparent from the following disclosure and drawings, is addressed by the present invention which comprises in one aspect a web browser that does not display static icons in a default mode of operation. Since the browser does not display static icons, it significantly reduces the risks of screen burn when used with a television display or other types of display.

The functions normally performed by the static icons are mapped to keys on a keyboard. These static icons perform functions such as favorites, home, back, forward, stop, refresh, close browser, search, address bar, and text size normally supported in a conventional browser. These functions can also be implemented using a pointing device, so that no static icons are displayed in the browser according to the principles of the invention.

Another aspect of the invention is a television apparatus having a web browser function comprising a display, means for receiving television signals, means for accessing the Internet, a keyboard, and means to invoke the browser on the display in a default mode wherein static icons are not displayed.

Another aspect of the invention is a method of avoiding screen burn on a display screen of a television apparatus which includes a browser function comprising displaying a browser having no static icons on the display screen and assigning mapping browser functions to the special function keys on the keyboard.

Any type of display can be used in the television apparatus, for example cathode ray tubes and projection televisions such as high definition television displays. The invention is especially useful in high definition apparatus, projection televisions, which are subject to such screen burn due to static images being displayed, and plasma displays. Although the exact amount of screen burn varies between different types and models of television displays and depends on the length of time a static image is displayed on the screen, and also varies according to user settings such as brightness and contrast, in general the high definition projection television type is the most prone to this problem.

It is preferred to provide a keyboard for invoking and operating the browser application, which is preferably built in to the television apparatus, although set top boxes can alternatively be used. Set top boxes can be used with normal definition and high definition sets, and with analog as well as digital sets.

In addition to non-display of static browser icons, which are normally displayed in conventional browsers such as all versions of Internet Explorer and Netscape browsers, the television apparatus can be programmed to close the browser and display television programming after a predetermined timeout interval. The timeout interval may be set at the factory and in some embodiments can be defined or redefined by the user. For example, the factory set default idle timeout interval can be five minutes of non-activity during browser mode causing toggling to normal television, with a user interface allowing resetting to higher or lower number of minutes of browser mode inactivity before switching to TV mode.

The television apparatus has software and hardware for connecting to the Internet and can include cable, DSL, satellite, or modem connection subsystems, for example. Wireless Internet connection systems are becoming available for computers at the present time, and it is assumed that such systems will also be adapted to television sets having Internet capability, in which case the present invention would be very useful to prevent screen burn on the displays.

The functions of the static icons are replaced in the present invention by any of a variety of software and hardware. For example, a remote control device can be used to send a signal to the television apparatus, which causes the static icons to be temporarily displayed and selected when appropriate. A preferred system is to map keyboard keys to browser functions that in the prior art required selection with a pointing device from static icons displayed in the browser interface. In some embodiments, special, dedicated keyboard keys are provided, for example several favorite keys which, when pressed in browser mode, cause the browser to call up one of the favorite URLs which correspond to a favorite web pages which have previously been programmed by the user or the factory. In a preferred embodiment, eight dedicated favorite keys are provided, and with the use of key combinations with Control, Alt, and/or Shift, thirty-two or more Favorite web pages can be assigned and called up by the user with those eight Favorite keys. A preferred method of assigning, or bookmarking, a web page is by an extended holding down of a favorite key while the web page is being displayed. For example, if www.my-favorite-bank.com is showing in the browser and the user holds down Favorite key #6 for 10 seconds, the previous web page assigned or mapped to Favorite key #6 will be replaced by www.my-favorite-bank.com. Upon subsequent pressing of Favorite key #6, www.my-favorite-bank-.com the system will attempt to open that web page.

Other dedicated keyboard keys can be Open, Close Browser, Close Window, Search, Previous Window, Next Window, Display Address Bar, Find Text, Text Size Increase, Text Size Decrease, Up, Down, Right, and/or Left, for example. In some embodiments, keyboard keys can have dual functions, one being the normal functions such as down arrow, and the second being a special function to replace the down arrow of the vertical scroll bar.

The hardware employed to invoke the browser may be conventional, for example a dedicated integrated circuit, for example a flash and MIPS integrated circuit, which is the CPU of the television apparatus. A preferred operating system includes WinCE software residing in the integrated circuits on a digital module board, but modified according to the invention versus conventional browser software to replace the static icons. Although it is not necessary to include a pointing device, in some embodiments a mouse or other type pointing device will be included, for example the pointing device may be included with the keyboard, and the keyboard can communicate with the main television apparatus by infrared signals rather than with cable. The system has been designed such that the dedicated keys on the keyboard are uniquely identified and interpreted by the application to invoke the same functionality that would be available through the application menus and/or tool bars.

Examples of this invention include the use of dedicated keyboard key to cause the browser to navigate to the default home page (a function typically provided by a graphical icon component in the tool bar); navigating to the previously displayed page (i.e., BACK) which is typically found as graphical icon on the browser's toolbar; invoking the FIND function (to find a specified text string on the currently loaded page) which is commonly found as an menu item in the Edit menu.

As a result of removing the graphical user controls from the browser display, the user cannot manually enter the address of the desired URL by moving the mouse to address bar typically included in the browser toolbar. A preferred mode is to dedicate a key display the address bar, and immediately place focus on it such that the user can press the dedicated "Address" key, and type in the desired URL. When completing the address entry and pressing ENTER, the address bar is removed, and the browser navigates to the specified URL. If the user invokes the address bar entry by pressing the Address key on the keyboard, but does not enter a complete URL (indicated by pressing ENTER), the bar will timeout and be automatically removed after 15 seconds. This will prevent the image of the address from causing screen burn due to user inactivity.

An additional technique employed to mitigate screen burn or screen aging effects of the browser is to specify an "Idle timeout" such that if the user does not interact with the browser for a specified period, the browser will present a dialog warning box to the user informing him/her that if a browser command is not received in a short time period (30 seconds) the browser will automatically close and return the user to TV viewing. After the specified time interval, the browser will terminate, close, and return the user to 'normal' (non-browser) TV viewing. The specification of "browser command" indicates that channel changes, volume changes, and "TV viewing" commands are different and distinct from browser commands. The method of entry into the browser dictates the "idle timeout" value. To wit: invocation of the browser from the menu will use a shorter timeout than via the keyboard command to invoke the browser.

BRIEF DESCRIPTION OF DRAWINGS

FIG. 4 is an illustrative pop-up menu, which includes functions conventionally provided by static icons, according to the principles of the invention when a button of a pointing device is pressed.

MODES FOR CARRYING OUT THE INVENTION

Figure 1:
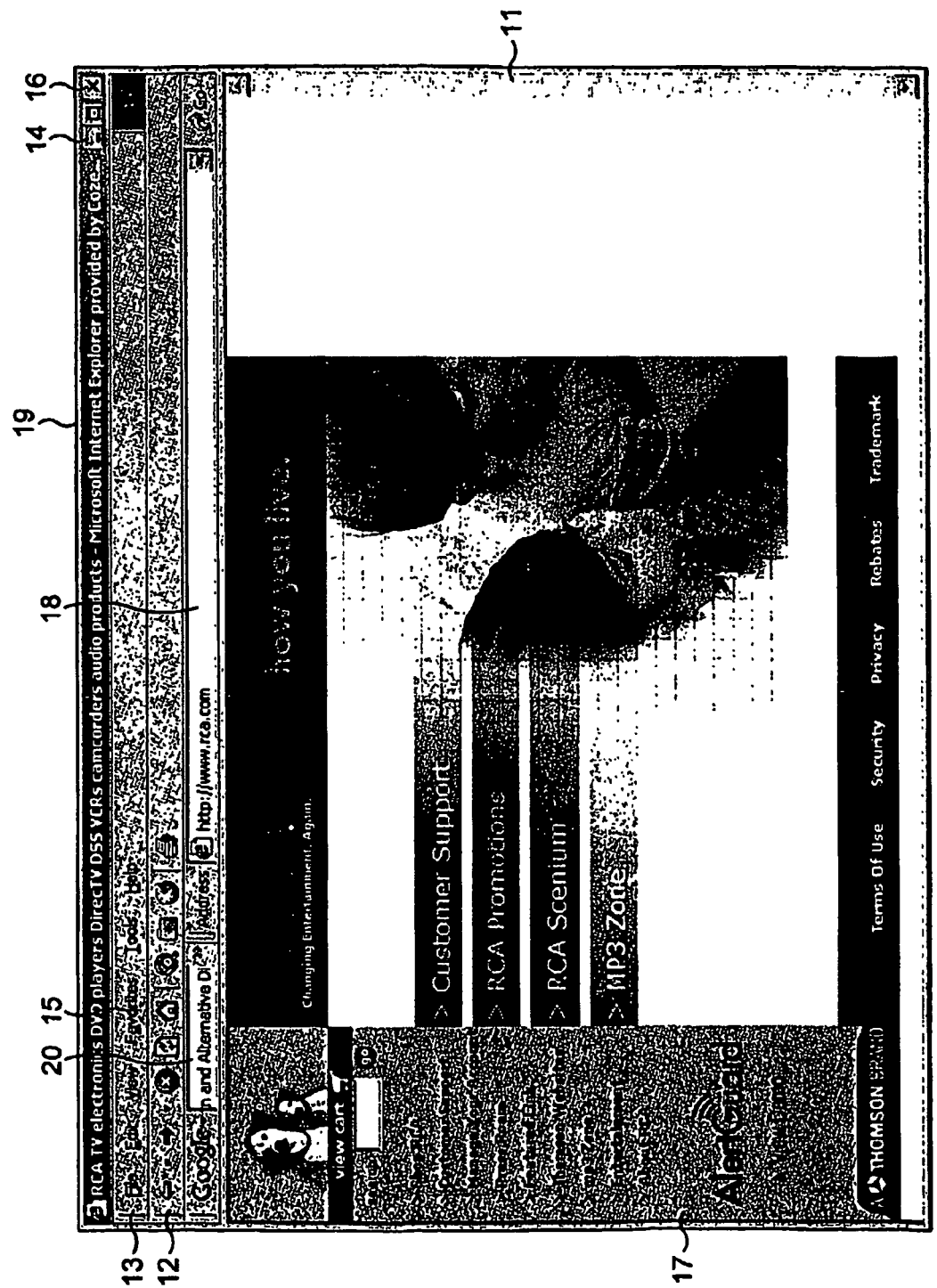
FIG. 1 is an embodiment of a browser on a television display having static icons according to the prior art.

Referring to FIG. 1, a conventional browser is illustrated as being displayed on a high definition projection television display. The browser has several static icons, including a vertical scroll bar 11, tool bars 12, 13, and 14, including a favorites pull down menu 15, close window 16, search 20, an address bar 18, and a title bar 19. The browser also has a display area 17 for displaying a web page. Since the static icons are displayed in one place while the browser is being used for accessing web pages from the Internet, even though the pages change while the user browses, the icons do not, causing over time the icons to become burned to some degree in the television display.

Figure 2:
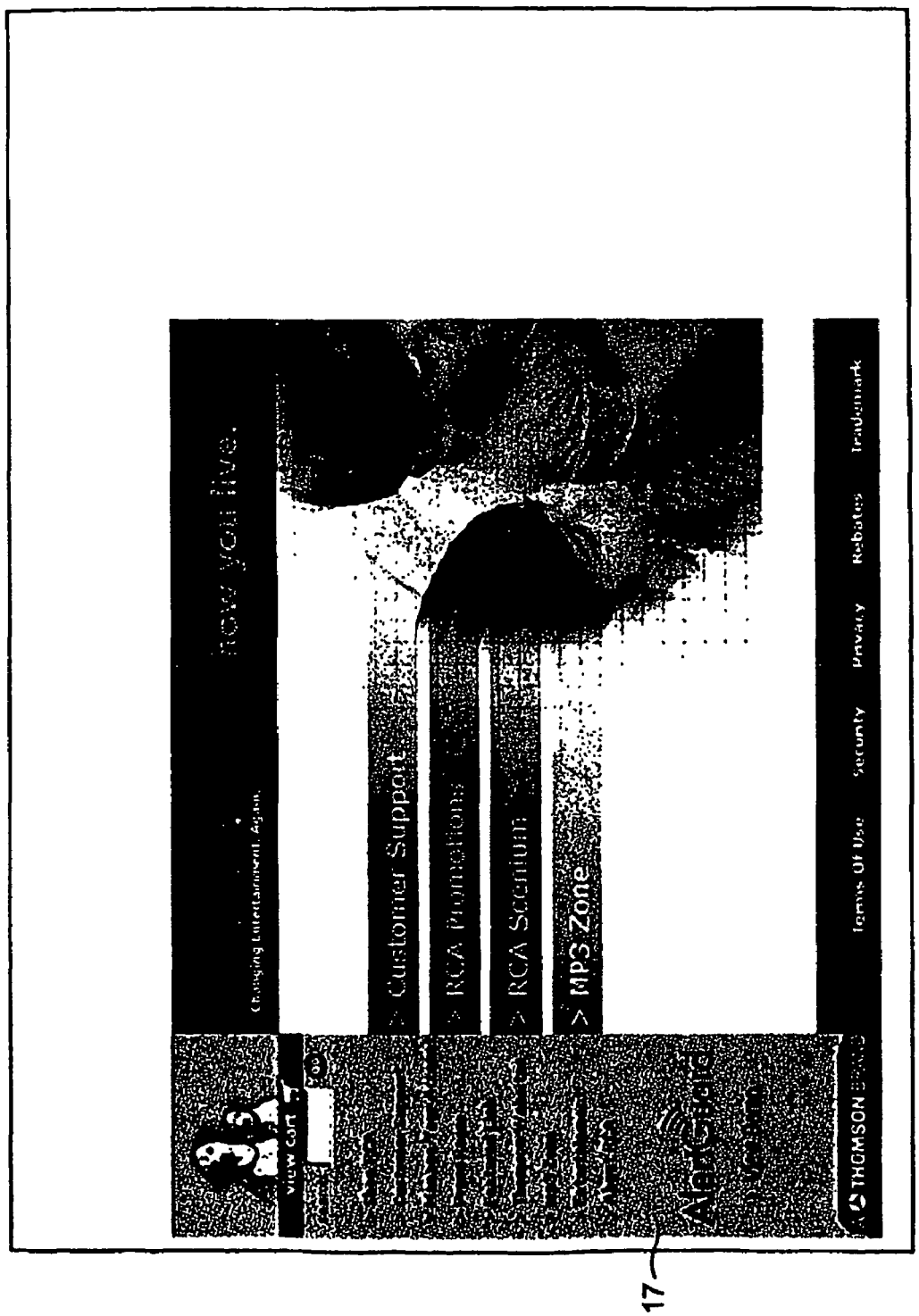
FIG. 2 is an embodiment of a browser on a television display having no static icons according to the invention.

FIG. 2 illustrates a browser embodiment according to the invention wherein no static icons are displayed. Only the web page (which is not static unless the user chooses to view only the one page) appears on the display. As used herein, a web page, and text and graphics included in a web page are not considered static icons. If the user does not change the web page, the system determines an idle condition and in order to save the screen from burn, closes down the browser and toggles back to the last television channel viewed before the browser was invoked. As an alternative, a conventional screen saver can be invoked when the user does not change the web page for a pre-determined time.

Although the browser is illustrated with a television display, the browser can be used with other types of display such as a computer monitor or a LCD display on a handheld device.

Figure 3:
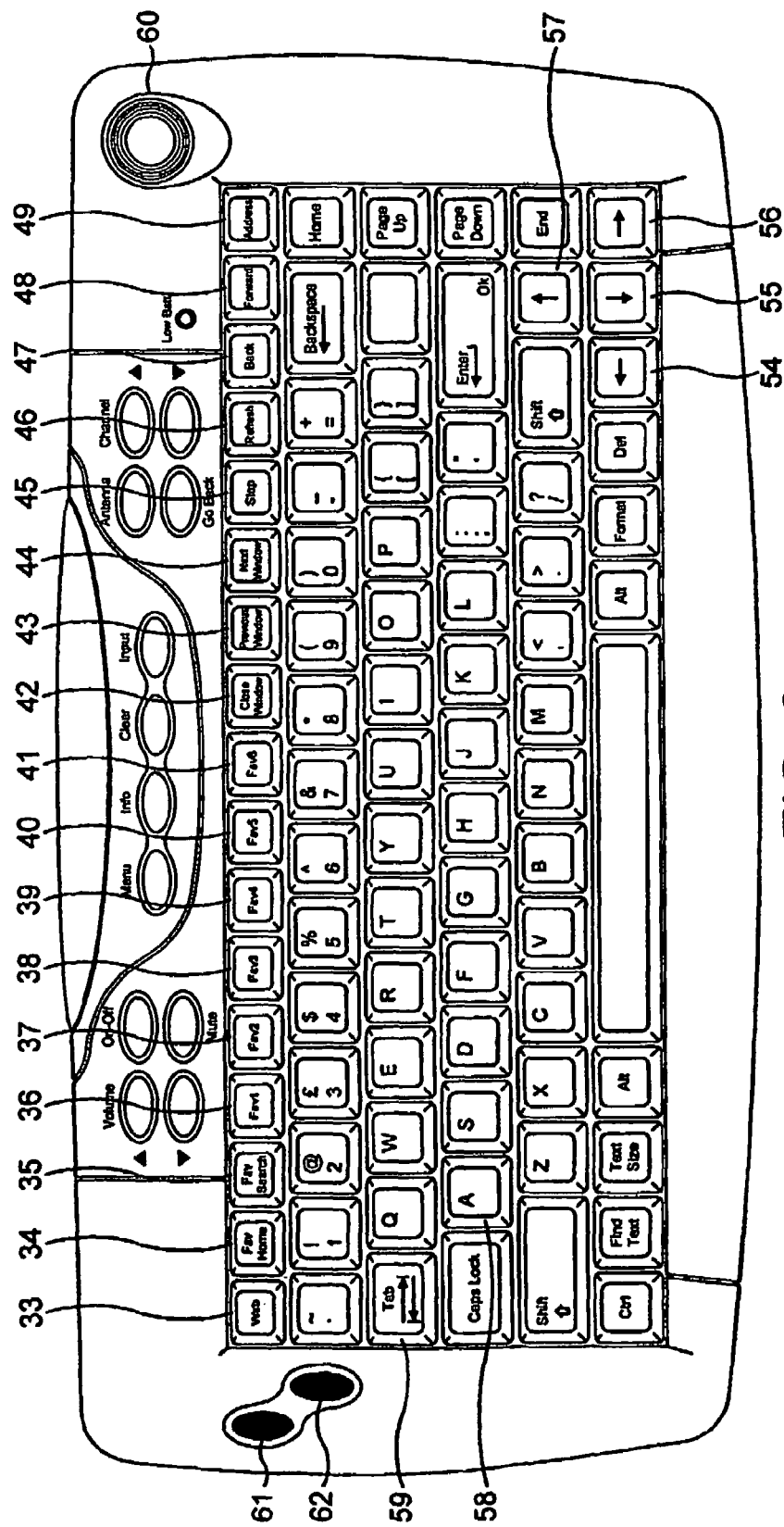
FIG. 3 is a top view of an embodiment of a keyboard for use in the invention, including special browser function keys.

FIG. 3 illustrates a keyboard embodiment wherein special function keys in addition to conventional keys are included as set forth in the following table to implement functions conventionally provided by static icons. The illustrated keyboard is a special keyboard for use with a television having an integrated browser. In the table, the first column indicates the reference numerals in FIG. 3, the second column indicates the words on various keys in FIG. 3, the third column indicates the function of each key when the television is in browser mode, the fourth column indicates the function of each key when the television is in television mode, and the last column indicates the function of each key when the television is in the browser mode with a video window. When the television is in the browser mode with a video window, a portion of the television screen is used for the browser and the remainder is used for television signals.

| Reference Numeral In Fig. 3 | Key | Function During Browser Mode | Function During Television Mode | Function During Browser Mode With Video Window |
|---|---|---|---|---|
| | VOLUME UP | Ignore this keypress. | Increases TV volume. | Increases TV volume. Volume OSD is not displayed. |
| | VOLUME DOWN | Ignore this keypress. | Decreases TV volume. | Decreases TV volume. Volume OSD is not displayed. |
| | ON-OFF | Turns off TV. | Toggles TV power state. | Turns off TV. |
| | MUTE | Ignore this keypress. | Mutes TV volume. | If volume is not muted, pressing MUTE mutes the TV volume. if volume is muted, pressing MUTE unmutes TV volume. MUTE OSD is not displayed. |
| 32 | MENU | Closes browser. Opens main menu. (Needed as an exit for when browser is launched from main menu) | Toggles menu state. | Closes browser. Opens main menu. (Needed as an exit for when browser is launched from main menu) |
| | INFO | Does nothing. | Displays/Dismisses channel banner. | Does nothing. |
| 33 | CLEAR | Quits the browser. | Clears OSDs. | Quits the browser. |
| | INPUT | Ignore this keypress. | Shows next video input source. | Ignore this keypress. |
| | ANTENNA | Ignore this keypress. | Toggles between Antenna A Input and Antenna B input, | Operates the same as when browser is closed. This button's complete behavior is specified in the section labeled "section "Signal Source Selection (Input Seiection)". (If video window has RF input in it, this key tunes to other RF input. If video window is blanked because user entered browser from any video input, this key puts the last-viewed RF input into the video window. |
| | GO BACK | Ignore this keypress. | Goes to previously tuned channel before the current channel. | Operates the same as when browser is closed: Goes to the previous TV channel. This button's complete behavior is specified in the section labeled "section "Signal Source Selection (Input Selection)". (If video window is blanked because user entered browser from any video input, this key is ignored.) |
| | CHANNEL UP | Ignore this keypress. | Goes to next channel in channel list. | Operates the same as when browser is closed: Goes to the next TV channel in the current channel list. This button's complete behavior is specified in the section labeled |

-continued

| Reference Numeral In Fig. 3 | Key | Function During Browser Mode | Function During Television Mode | Function During Browser Mode With Video Window |
|---|---|---|---|---|
|  | CHANNEL DOWN | Ignore this keypress. | Goes to previous channel in channel list, | section "Signal Source Selection (Input Selection)". (If video window is blanked because user entered browser from any video input, this key is ignored.) Operates the same as when browser is closed: Goes to the previous TV channel in the current channel list. This button's complete behavior is specified in the section labeled "section "Signal Source Selection (Input Selection)". (If video window is blanked because user entered browser from any video input, this key is ignored.) |
|  | WEB | Closes browser. | Opens browser. Goes to www.rca.com/Access/Scenium/311 | Closes browser. |
| 34 | FAV HOME | Goes to www.rca.com/Access/Scenium/311 unless otherwise programmed by user | Opens browser. Goes to www.rca.com/Access/Scenium/311 unless otherwise programmed by user | Goes to www.rca.com/Access/Scenium/311 unless otherwise programmed by user |
| 35 | FAV SEARCH | Goes to www.msn.com unless otherwise programmed by user | Opens browser. Goes to www.msn.com unless otherwise programmed by user | Goes to www.msn.com unless otherwise programmed by user |
| 36 | FAV1 | Goes to www.rca.com/Access/Scenium/311 unless otherwise programmed by user | Opens browser. Goes to www.rca.com/Access/Scenium/311 unless otherwise programmed by user | Goes to www.rca.com/Access/Scenium/311 unless otherwise programmed by user |
| 37 | FAV2 | Goes to www.rca.com/Access/Scenium/311 unless otherwise programmed by user | Opens browser. Goes to www.rca.com/Access/Scenium/311 unless otherwise programmed by user | Goes to www.rca.com/Access/Scenium/311 unless otherwise programmed by user |
| 38 | FAV3 | Goes to www.rca.com/Access/Scenium/311 unless otherwise programmed by user | Opens browser. Goes to www.rca.com/Access/Scenium/311 unless otherwise programmed by user | Goes to www.rca.com/Access/Scenium/311 unless otherwise programmed by user |
| 39 | FAV4 | Goes to www.rca.com/Access/Scenium/311 unless otherwise programmed by user | Opens browser. Goes to www.rca.com/Access/Scenium/311 unless otherwise programmed by user | Goes to www.rca.com/Access/Scenium/311 unless otherwise programmed by user |
| 40 | FAV5 | Goes to www.rca.com/Access/Scenium/311 unless otherwise programmed by user | Opens browser. Goes to www.rca.com/Access/Scenium/311 unless otherwise programmed by user | Goes to www.rca.com/Access/Scenium/311 unless otherwise programmed by user |
| 41 | FAV6 | Goes to www.rca.com/Access/Scenium/311 unless otherwise programmed by user | Opens browser. Goes to www.rca.com/Access/Scenium/311 unless otherwise programmed by user | Goes to www.rca.com/Access/Scenium/311 unless otherwise programmed by user |
| 42 | CLOSE WINDOW | Closes the current browser window. Same function as CTRL + W. | No action occurs when browser is not open. | Closes the current browser window. Same function as CTRL + W. |
| 43 | PREVIOUS WINDOW | Displays the previous browser window, | No action occurs when browser is not open. | Displays the previous browser window. |
| 44 | NEXT WINDOW | Displays the next browser window, | No action occurs when browser is not open. | Displays the next browser window. |

-continued

| Reference Numeral In Fig. 3 | Key | Function During Browser Mode | Function During Television Mode | Function During Browser Mode With Video Window |
|---|---|---|---|---|
| 45 | STOP | Stops loading the current page. | No action occurs when browser is not open. | Stops loading the current page. |
| 46 | REFRESH | Reloads the current page. | No action occurs when browser is not open. | Reloads the current page. |
| 47 | BACK | Goes to previous page (if one exists, otherwise nothing occurs). | No action occurs when browser is not open. | Goes to previous page (If one exists. otherwise nothing occurs). |
| 48 | FORWARD | Goes to next page (if one exists, otherwise nothing occurs). | No action occurs when browser is not open. | Goes to next page (If one exists, otherwise nothing occurs). |
| 49 | ADDRESS | Displays the Address Bar (i.e., the URL ("website") entry bar). if list of previous URLs is displayed, pressing ADDRESS again does not remove address bar. | No action occurs when browser is not open. | Displays the Address Bar (i.e., the URL ("website") entry bar). if list of previous URLs is displayed, pressing ADDRESS again does not remove address bar. |
|  | 0-9 | Enters digits into the highlighted text/numeric entry field of the web page | Displays banner with channel entry field and first digit displayed. | Enters digits into the highlighted text/numeric entry field of the web page |
|  | CTRL | CTRL function. | No action occurs when browser is not open. | CTRL function. |
|  | FIND TEXT | Displays the Find window, If the Find window is already displayed, pressing FIND TEXT button removes the Find window, | No action occurs when browser is not open. | Displays the Find window, if the Find window is already displayed, pressing FIND TEXT button removes the FInd window. |
|  | TEXT SIZE | Increases the text size to the next larger text size. | No action occurs when browser is not open. | Increases the text size to the next larger text size. |
|  | TEXT SIZE + CTRL | Decreases the text size to the next smaller text size. | No action occurs when browser is not open. | Decreases the text size to the next smaller text size. |
|  | FORMAT | Browser goes to Browser/Video Window mode. (Even if video window is blanked because user entered browser from any video input, this key still works.) | Toggles Screen Format options (Normal > Stretch > Zoom). | Browser goes to Full-Size Browser with No Video Window mode. (Even if video window is blanked because user entered browser from any video input, this key still works.) |
| 57/55/ 54/56 | Up/Down/ Left/Right | Moves web page up, down, left, or right | Moves highlight in the guide and menu and other OSDs (e.g.. during channel entry, RIGHT AND LEFT Arrows move highlight to between major and minor channel fields). | Moves web page up, down, left, right. |
| 58 (A) | Alpha characters (A-Z etc.) | Enters characters into the highlighted text/numeric entry field of the web page. | No action occurs when browser is not open. | Enters characters into the highlighted text/numeric entry field of the web page. |
|  | Fn, Ctrl, Alt, Shift, CAPS LOCK |  | No action occurs when browser is not open. |  |
|  | Enter/OK | Selects (i.e., its normal function), | Acts same as OK button on remote - selects a highlighted item in the guide, menu, or other OSD. | Selects (i.e., its normal function). |
| 59 | Tab | TAB function | No action occurs when browser is not open. | TAB function |

The following table illustrates a mapping of certain browser functions, obtained by pointing to and clicking on icons in a conventional browser to keys on the special keyboard illustrated in FIG. 3.

| To do this | Press this |
| --- | --- |
| Move forward through the items on a Web page, the Address bar, and the Links bar. | TAB |
| Move back through the items on a Web page, the Address bar, and the Links bar. | SHIFT + TAB |
| Go to your Home page. | ALT + HOME |
| Go to the next page. | ALT + RIGHT ARROW |
| Go to the previous page. | ALT + LEFT ARROW or BACKSPACE |
| Scroll toward the beginning of a document. | UP ARROW |
| Scroll toward the end of a document. | DOWN ARROW |
| Scroll toward the beginning of a document in larger increments. | PAGE UP |
| Scroll toward the end of a document in larger increments. | PAGE DOWN |
| Move to the beginning of a document. | HOME |
| Move to the end of a document. | END |
| Find on this page. | CTRL + F |
| Refresh the current Web page. | CTRL + R |
| Stop downloading a page. | ESC |
| Go to a new location. | CTRL + O or CTRL + L |
| Close the current window. | CTRL + W |
| Activate a selected link. | ENTER |

In a preferred embodiment, each of the six FAV keys is programmable with four favorites per key. One favorite is accessed by pressing the FAV key alone; a second is accessed by pressing Control-FAV, the third by pressing ALT-FAV, and the fourth by pressing SHIFT-FAV. The FAV keys are programmable by holding down the FAV key, or a Control-FAV or ALT-FAV combination for at least 4 seconds, after which a successful programming of a key is indicated by a pop-up message on screen. Thereafter pressing the FAV key or ALT-FAV or Control-FAV combination will send the user to the corresponding saved URL. An advantage to this approach is that the website favorites are directly and immediately available via the keyboard. The user does not have to navigate the pointing device to a static menu or toolbar and scroll through a list.

No status bars are necessary because the arrow keys and the PAGE UP and the PAGE DOWN keys will let an user know whether he has come to the end of a direction. As an alternative, when a user presses one of the four keys—the arrow keys and the PAGE UP and the PAGE DOWN keys—the corresponding status bar is displayed, and when a displayed status bar is not used for a predetermined time, it is removed.

When the browser is closed and then reopened during the same TV viewing session, the last viewed web page is accessed.

Although a special keyboard for use with a television having an integrated browser is illustrated, a conventional keyboard used in a personal computer (PC) can be used to perform the functions conventionally provided by static icons as well. For example, the F1-F12 keys can be used to perform the functions provided by FAV HOME, FAV SEARCH, FAV1-6, CLOSE WINDOW, PREVIOUS WINDOW, and NEXT WINDOW keys of the special keyboard, respectively. Similarly, the arrow keys and the PAGE UP and DOWN keys in a conventional keyboard can be used to perform the same functions as those keys in the special keyboard. Those keys related to functions (other than the display function) of a television such INPUT are not included in a conventional keyboard, but they are not needed if the browser is used in a system that has no need to display television signals, for example, in a PC environment. Of course, in a PC environment, in addition to using a CRT or a LCD monitor, one certainly can use a television as a display device but usually a PC is not used to receive or display television signals.

The special keyboard shown in FIG. 3 also includes a pointing device, which includes a joystick 60 for moving a pointer, a left-click selection button 61, and a right-click selection button 62. The functions conventionally provided by static icons can also be implemented by using the pointing device. For example, when a user presses the right-click selection button 62 of the pointing device, a pop-up menu 400 shown in FIG. 4 is displayed. The pop-up menu includes functions conventionally provided by static icons. After the user has selected a function on the list by pressing the left-click selection button 61, the selected function is conventionally performed and the pop-up menu is removed. The pointing device can be external to a keyboard and can be of any types such as a mouse.

Figure 5:
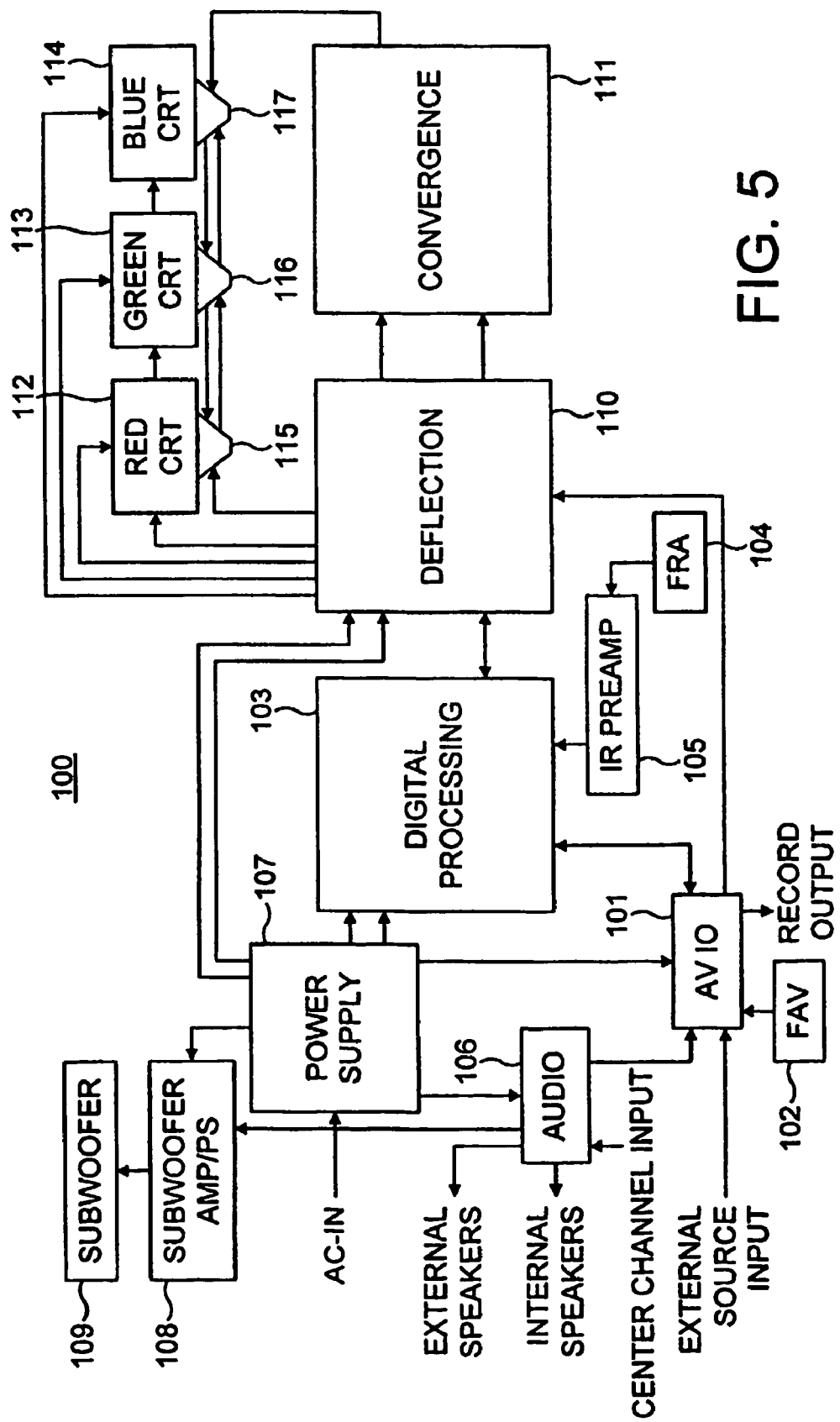
FIG. 5 is a schematic of an embodiment of an apparatus according to the invention.

Referring to FIG. 5, an exemplary video apparatus 100 suitable for implementing the present invention is shown. For purposes of example and explanation, apparatus 100 represents an exemplary portion of a television signal receiver embodied as a projection screen television. However, it will be intuitive to those skilled in the art that principles of the present invention may be applied to other apparatus.

As shown in FIG. 5, apparatus 100 comprises an audio/video input/output (AV IO) block 101, a front audio/video (FAV) connector 102, a digital processing block 103, a front panel assembly (FPA) 104, an infrared (IR) preamp 105, an audio block 106, a power supply 107, a subwoofer amp/power supply 108, a subwoofer 109, a deflection block 110, a convergence block 111, CRTs 112 to 114, and yokes 115 to 117. The foregoing elements of FIG. 5 are operatively coupled as indicated by the data lines shown in FIG. 5. As will be intuitive to those skilled in the art, many of the elements represented in FIG. 5 may be embodied using integrated circuits (ICs).

AV IO block 101 is operative to receive and process audio and/or video inputs, and to output processed audio and/or video signals to other elements of apparatus 100, as indicated in FIG. 5. According to an exemplary embodiment, AV IO block 101 receives audio and/or video inputs from an external source (e.g., via satellite, terrestrial, cable, Internet, etc.) and also receives processed audio inputs from audio block 106. According to this exemplary embodiment, AV IO block 101 processes these inputs and outputs composite video signals and all audio signals to digital processing block 103 for additional processing, while outputting component video signals (e.g., 2H, 2.14H, Y, Pr, Pb video information) to deflection block 110. AV IO block 101 is also operative to provide audio and/or video outputs to a recording device (not shown) for recording. FAV connector 102 is operative to provide audio and/or video inputs to AV IO block 101.

Digital processing block 103 is operative to perform various digital functions of apparatus 100, such as tuning, demodulation, signal decompression, memory and other functions and, in the case of the present invention, includes the operating system for the browser and the browser commands from the keyboard. Digital processing block 103 outputs processed video signals to deflection block 110 which enable a visual display of either television or browser, and may also provide processed video signals to AV IO block 101 for output to a recording device (not shown). As will be explained later herein, digital processing block 103 is also operative to enable various user-activated display functions of apparatus 100, such as a video sizing function, a program guide function, a browser function, a picture-in-picture (PIP) function, or other display function. Digital processing block 103 is operative to display a browser with no static icons and to record favorite entries in the manner described herein.

FPA 104 is an interface operative to receive user inputs, such as via an IR hand-held remote control, keyboard, a pointing device, or other input device, and to output signals corresponding to the user inputs to IR preamp 105. IR preamp 105 is operative to amplify the signals provided from FPA 104 for output to digital processing block 103.

Audio block 106 is operative to perform various audio processing functions, and to output processed audio signals.

Power supply 107 is operative to receive an input alternating current power signal (AC-IN), and to output voltage signals which power the various elements of apparatus 100, as indicated in FIG. 5.

Deflection block 110 is operative to control deflection functions of apparatus 100. According to an exemplary embodiment, deflection block 110 outputs deflection control signals to yokes 115 to 117, which control horizontal and vertical deflection of the high-intensity beams generated by CRTs 112 to 114, respectively. Deflection block 110 is also operative to output color control signals to CRTs 112 to 114 responsive to the processed video signals and other control signals provided from digital processing block 103. Also according to an exemplary embodiment, deflection block 110 is operative to output voltage signals to convergence block 111 and CRTs 112 to 114 for their power supplies.

Convergence block 111 is operative to control convergence functions of apparatus 100. According to an exemplary embodiment, convergence block 111 outputs convergence control signals to yokes 115 to 117, as indicated in FIG. 4, which control a positive convergence adjustment for precisely focusing the high-intensity beams emitted from CRTs 112 to 114 on a screen (not shown).

CRTs 112 to 114 are operative to generate high-intensity red, green and blue beams, respectively, for display on a screen responsive to the color control signals from deflection block 110. Yokes 115 to 117 are operative to control CRTs 112 to 114, respectively, responsive to the deflection control signals from deflection block 110 and the convergence control signals from convergence block 111.

Figure 6:
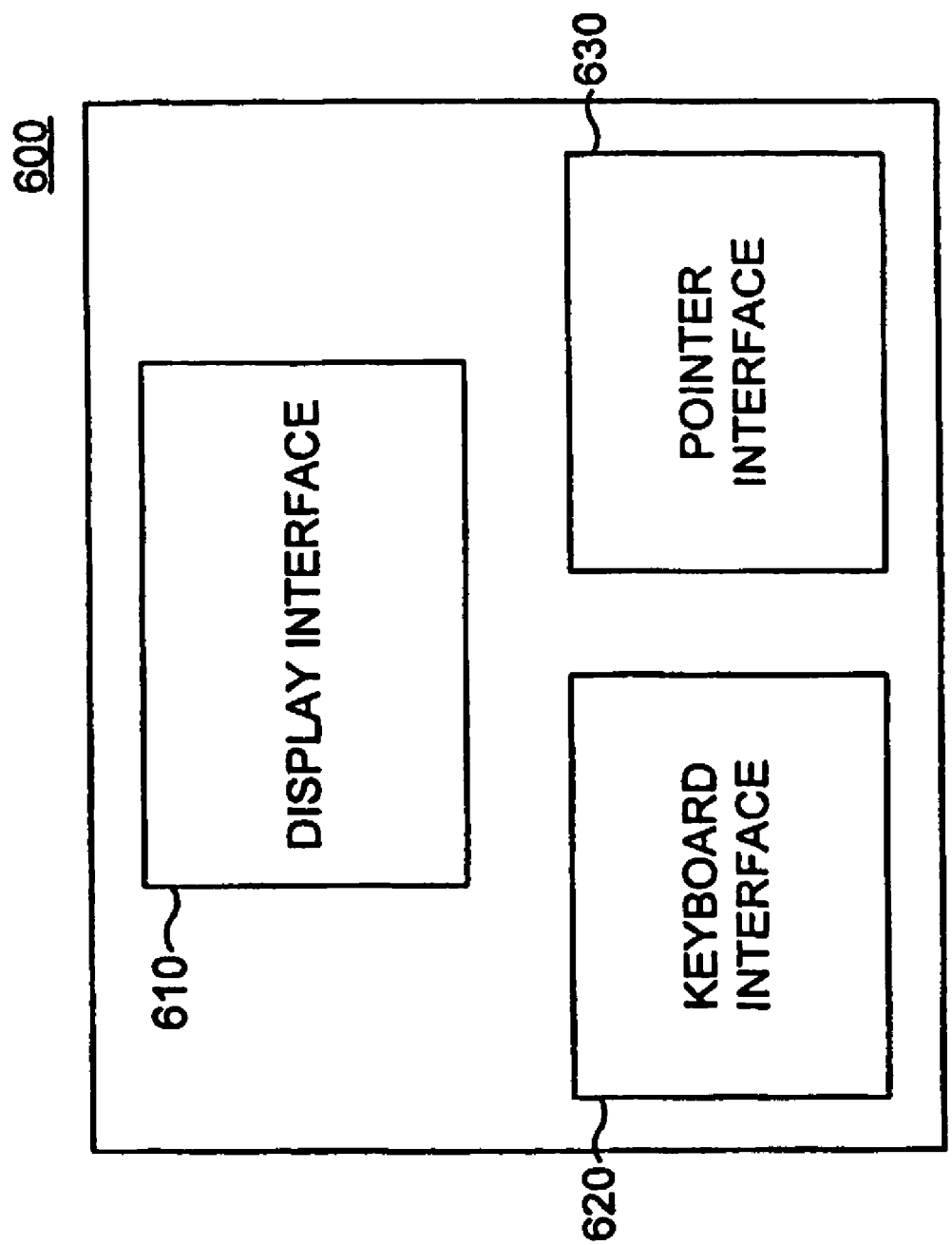
FIG. 6 is a block diagram of a web browser according to the principles of the invention.

Referring to FIG. 6, a web browser 600 according to the principles of the invention is illustrated. The browser 600 includes a display interface module 610 for displaying a web page without static icons, a keyboard interface module 620 for receiving keypress signals from a keyboard, and pointer interface 630 for receiving signals from a pointing device. These modules can be implemented as software executable by a microprocessor such as the digital processing unit 103 shown in FIG. 5, or ASIC (application specific integrated circuit). The keyboard interface module 620 receives keypress signals and performs associated functions as illustrated above, so that no static icons are needed. Similarly, the pointer interface module 630 receives signals from a pointing device and performs functions as illustrated above so that static icons are not needed.

While the invention and the best mode known to the inventors for carrying it out has been described herein in sufficient detail for others skilled in this art to understand it and to make and use it, various alternatives, modifications, and improvements should become readily apparent without departing from the spirit and scope thereof.

The invention claimed is:

1. A television apparatus capable of providing a web browser, said television apparatus comprising:
    means for receiving a user input to invoke said web browser;
    means for enabling display of said web browser responsive to said user input, and for enabling display of television signals while said web browser is not displayed; and
    wherein when said web browser is displayed:
    no static icons are displayed, and user functions corresponding to said static icons are provided via a pop-up menu;
    said web browser automatically closes and said television signals are displayed after an idle timeout interval elapses; and
    said idle timeout interval varies based on a manner in which said web browser was invoked.

2. The television apparatus of claim 1, wherein said user functions include favorites, home, back, forward, stop, refresh, close browser, search, address bar, and text size.

3. The television apparatus of claim 1, wherein said pop-up menu is displayed responsive to user depression of a key of a user input device.

4. The television apparatus of claim 3, wherein said user input device includes a pointing device.

5. The television apparatus of claim 1, wherein said idle timeout interval equals a first time period if said web browser was invoked via a menu and equal a second time period if said web browser was invoked via a keyboard, said first time period being different from said second time period.

6. The television apparatus of claim 5, further comprising projection display means for displaying either said television signals or said web browser.

7. The television apparatus of claim 5, wherein said first time period is less than said second time period.

8. The television apparatus of claim 1, further comprising input/output means for enabling access to the Internet via at least one of a cable connection, a DSL connection, and a modem.

9. The television apparatus of claim 1, wherein said user functions are mapped to keyboard keys.

10. The television apparatus of claim 9, wherein said user functions are mapped to said keyboard keys according to at least one of: a favorites function to favorite keys, a back function to a back key, a forward function to a forward key, an open function to an open key, a close browser function to a clear key, a close window function to a close window key, a search function to a search key, a previous window function to a previous window key, a next window function to a next window key, a display address bar function to an address key, a find text function to a find text key, a text size increase function to a text size increase key, an up function to an up key, a down function to a down key, a right function to a right key, and a left function to a left key.

11. The television apparatus of claim 1, wherein:
    a favorite web page is mapped to a favorite key of a user input device upon pressing said favorite key; and
    after said favorite web page is mapped to said favorite key, said favorite web page is opened in response to depression of said favorite key.

12. A method for providing a web browser via a television apparatus, said method comprising:
    receiving a user input to invoke said web browser;
    enabling display of said web browser responsive to said user input;
    enabling display of television signals while said web browser is not displayed; and wherein when said web browser is displayed;
no static icons are displayed, and user functions corresponding to said static icons are provided via a pop-up menu;
said web browser automatically closes and said television signals are displayed after an idle timeout interval elapses; and
said idle timeout interval varies based on a manner in which said web browser was invoked.

13. The method of claim 12, wherein said user functions include favorites, home, back, forward, stop, refresh, close browser search, address bar, and text size.

14. The method of claim 12, wherein said web browser and said television signals are displayed via a projection television.

15. The method of claim 12, wherein said user functions are mapped to keyboard keys.

16. The method of claim 15, wherein said user functions are mapped to said keyboard keys according to at least one of: a favorites function to favorite keys, a back function to a back key, a forward function to a forward key, an open function to an open key, a close browser function to a clear key, a close window function to a close window key, a search function to a search key, a previous window function to a previous window key, a next window function to a next window key, a display address bar function to an address key, a find text function to a find text key, a text size increase function to a text size increase key, an up function to an up key, a down function to a down key, a right function to a right key, and a left function to a left key.

17. The method of claim 12, further comprised of bookmarking a favorite web page provided via said web browser in response to detecting user depression of a key for a threshold time period while said favorite web page is being displayed.

18. The method of claim 12, wherein said idle timeout interval equals a first time period if said web browser was invoked via a menu and equals a second time period if said web browser was invoked via a keyboard, said first time period being less than said second time period.

* * * * *